Aug. 26, 1969   G. J. HOFFMAN ET AL   3,463,280
PAWL-TYPE CLUTCH ASSEMBLY

Filed Nov. 1, 1967   2 Sheets-Sheet 1

INVENTORS
GEORGE J. HOFFMAN
AND
BY JAMES E. ABELLA

ATTORNEYS.

Aug. 26, 1969  G. J. HOFFMAN ET AL  3,463,280
PAWL-TYPE CLUTCH ASSEMBLY
Filed Nov. 1, 1967  2 Sheets-Sheet 2
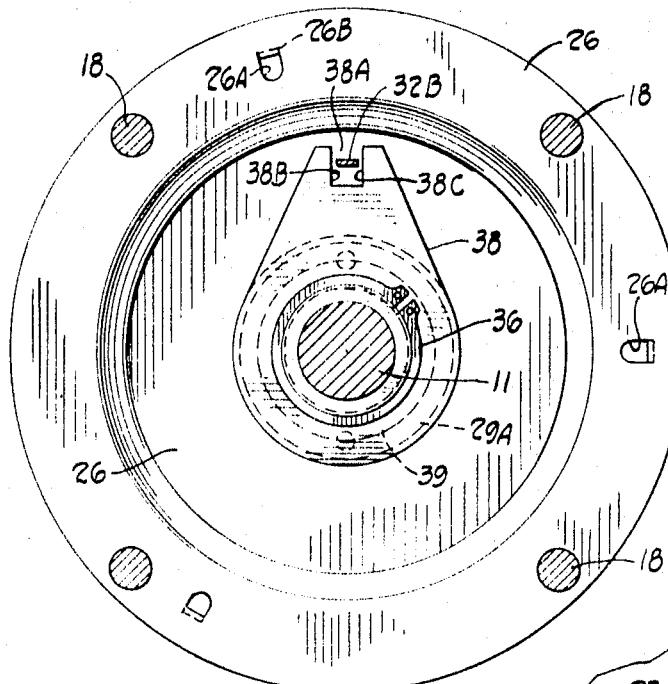
Fig. 6
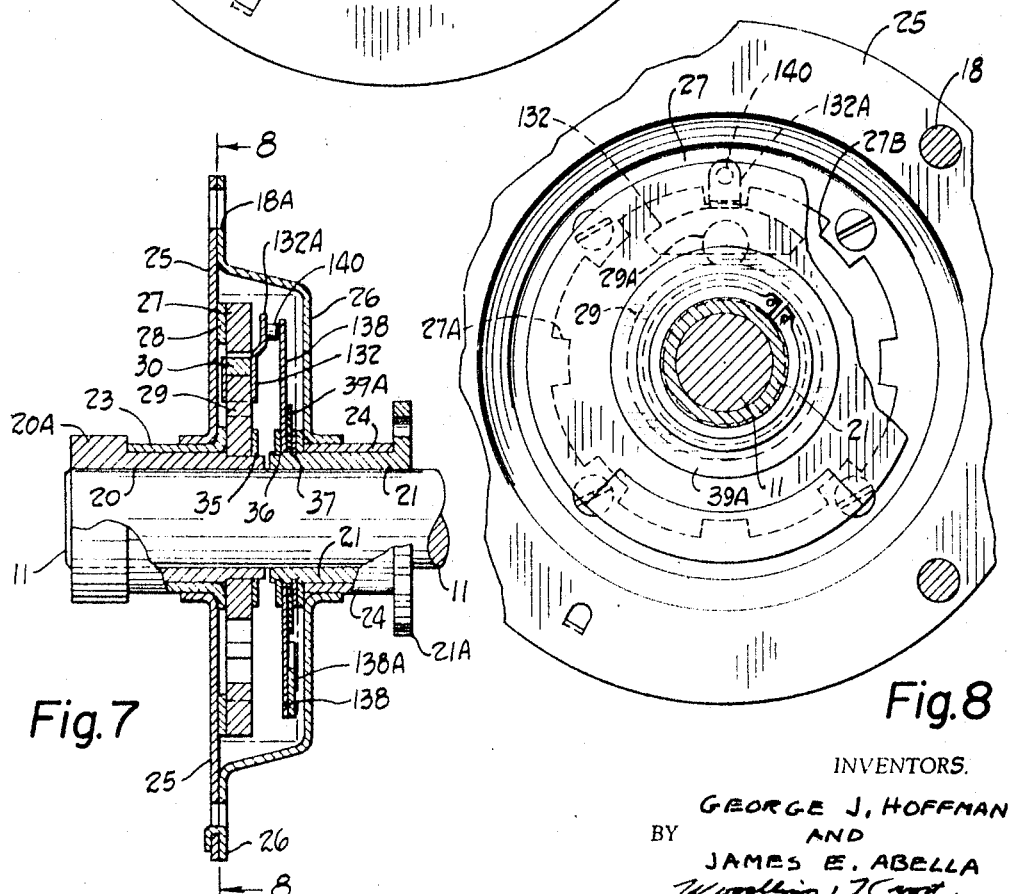
Fig. 7
Fig. 8
INVENTORS.
GEORGE J. HOFFMAN
BY AND
JAMES E. ABELLA
ATTORNEYS.

United States Patent Office 3,463,280
Patented Aug. 26, 1969

3,463,280
PAWL-TYPE CLUTCH ASSEMBLY
George J. Hoffman, Northfield, and James E. Abella, Maple Heights, Ohio, assignors to Kendale Industries, Inc.
Filed Nov. 1, 1967, Ser. No. 679,772
Int. Cl. F16d 11/06, 13/04, 43/00
U.S. Cl. 192—43.1                                         10 Claims

ABSTRACT OF THE DISCLOSURE

A pawl-type clutch assembly readily mounted on a rotatable shaft in the hub of a wheel to be driven by the shaft, the assembly including a first sleeve adapted to be secured to the shaft to rotate therewith, a second sleeve axially aligned with the first sleeve and rotatively mounted on the shaft but adapted to be secured to a fixed part to resist rotation with the shaft, a first annular member journalled on the first sleeve, a second annular member journalled on the second sleeve, a housing adapted to be secured to the said wheel and secured to said annular members to revolve therewith around the shaft axis, a ratchet wheel in the housing carried by a wall thereof, a pawl-carrier in the housing and secured to the first sleeve to revolve with the first sleeve about the shaft axis, a double-ended pawl carried by the pawl-carrier in position to drivingly engage the ratchet wheel in forward or reverse directions, an element mounted on the second sleeve and operatively connected to the pawl to actuate the same in accordance with the rotation of the shaft, the element through frictional resistance lagging the initial revolving movement of the carrier and pawl relative to the second sleeve to obtain actuation of the pawl during such initial revolving movement, the housing and said parts carried by said sleeves in said housing being mountable as a unit on a said shaft in the hub of a said wheel.

---

An object of our invention is to provide a clutch assembly readily mountable as a unit on a rotatable shaft in the hub of a wheel to be driven thereby.

Another object is the provision of a unique arrangement of parts of a clutch assembly assuring that the assembly is properly mounted on a shaft and connected to a wheel.

Another object is the provision of a clutch assembly which may be fabricated on an assembly line in a factory, shipped as a complete unit, and readily and correctly mounted at another location to a rotatable shaft and a wheel to be driven thereby.

Another object is the provision of a pawl-type clutch assembly having its parts compactly arranged and presecured in position within a housing to form a unit quickly and easily mounted on a rotatable shaft and secured to a wheel without mistake or improper positioning.

Another object is the provision of a unitary clutch assembly that is economical to fabricate and assemble and easily and efficiently mounted and used.

Other objects and a fuller understanding of our invention may be had by referring to the following description and claims, taken in conjunction with the accompanying drawings, in which:

FIGURE 6 is a cross-sectional view taken through the partially offset line 6—6 of FIGURE 1, looking in the direction of arrows 6—6, and being normal to the axis of the mechanism;

FIGURE 7 is a sectional view taken through the axis of a modified form of a clutch mechanism embodying our invention; and FIGURE 8 is a cross-sectional view taken through the partially offset line 8—8 of FIGURE 7, looking in the direction of the arrows 8—8, and being normal to the axis of the mechanism.

Figure 1:
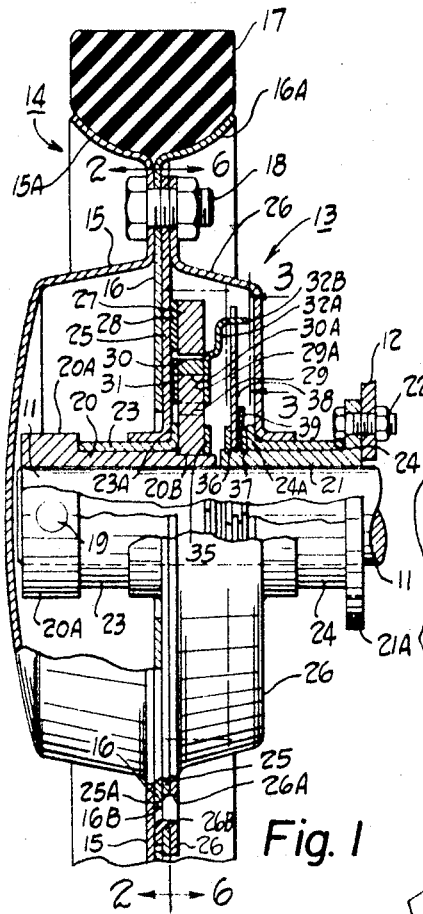
FIGURE 1 is a view, partially in section, taken through the axis of the preferred form of a clutch mechanism embodying features of our invention, and shown mounted to a vehicle wheel.

A clutch assembly embodying our invention is denoted generally by the reference character 13. This mechanism 13 is adapted to be mounted to a wheel assembly denoted generally by the reference character 14. The assembled mechanism 13 and wheel 14 are adapted to be mounted upon a rotatable shaft 11, whereby the shaft 11 is disposed within the hub of the assembly wheel and mechanism.

The shaft 11 in the assembled mechanism may be a driving axle of a mower, small tractor, or other vehicle, which shaft 11 is connected to a motor so as to be drivingly rotated on its axis. The shaft 11 is journalled on a fixed part 12 of the frame or body of the mower, tractor, or the like. A combined clutch mechanism 13 and wheel assembly 14 is mounted adjacent the opposite ends of the driven rotatable shaft 11, such as a tractor axle. The clutch mechanisms 13 are so constructed and arranged that the wheels 14 to which they are mounted at the opposite ends of the shaft 11 are driven in the same rotative direction and in accordance with the rotation of the shaft.

The wheel assembly 14 is generally made up of an outer disc or circular web 15 and an inner disc or circular web 16 which discs are spot-welded together to form the wheel structure. The outer ends of the discs are curved away from each other in the usual manner to form a rim made up of rim portion 15A and rim portion 16A. A usual rubber tire 17 is mounted on the rim of the wheel so as to revolve therewith. Extending through the assembled discs 15 and 16 at four equidistantly spaced positions therearound are openings 18A for accommodating four nut and bolt assemblies 18.

Mounted upon the outer axial end of shaft 11 is a first sleeve 20. The outer end of this sleeve 20 has a cylindrical flange 20A. A cross-pin 19 extends through aligned holes in the flange 20A and shaft 11 so as to non-rotatively secure the sleeve 20 to the shaft 11 and thus to cause this sleeve 20 to rotate with the shaft 11.

Mounted concentrically upon the shaft 11 at the other axial end of the assembly is a second sleeve 21. This second sleeve 21 has a cylindrical flange 21A, which flange 21A is secured to fixed part 12 of the tractor frame by means of a plurality of nut and bolt assemblies 22. Thus the shaft 11 may freely rotate in close fitting engagement within the second sleeve 21 but the second sleeve 21 is held against rotation with the shaft 11. Therefore, the first sleeve 20 rotates with the shaft 11 but the second sleeve 21 axially aligned therewith does not rotate with the shaft 11.

A first annular member 23 is mounted upon the first sleeve 20 so as to be freely revolvable around the sleeve 20. Thus there is a rotative bearing relationship between the first sleeve 20 and the annular member 23. They may be made of a suitable material to provide a good bearing action therebetween. The outer end of first annular member 23 slidably abuts the flange 20A. The inner end of first annular member 23 has a radially extending flange portion 23A at its inner axial end.

Rotatively mounted upon the outer wall of second sleeve 21 is a second annular member 24 which has a bearing relationship with the sleeve 21 whereby the annular member 24 may revolve around the sleeve 21. The materials of which the sleeve 21 an dthe annular member 24 are composed are such as to provide a good bearing action therebetween. The outer axial end of annular member 24 slidably abuts the flange 21A of sleeve 21. The inner axial end of annular member 24 has a radially extending flange 24A extending therearound as illustrated. These annular members 23 and 24 are also in axial alignment with each other and spaced apart as shown, the flanges 23A and 24A being circular and parallel with each other.

The clutch mechanism 13 includes a housing having a first radial wall 25 and a second radial wall 26 having its major inner portion spaced axially therefrom. The outer periphery portions of the walls 25 and 26 are joined together by spot-welding or the like to form an integral housing. The second wall 26 near the outer peripheral region is bent to be adjacent the wall 25 and thus the wall 26 is cup-shaped in form. To aid in properly positioning and holding the walls 25 and 26 of the housing together, the wall 25 is provided with three equidistantly spaced openings 25A therein. At locations corresponding to the openings 25A the wall 26 has pushed out tabs 26B leaving therein openings 26A aligned with the opening 25A. These tabs 26B are bent over through openings 25A and around to interlock with the wall 25. The housing walls 25 ad 26 are made with a suitable metal appropriate for stamping and for manipulation to provide for the described interlock Similarly the discs 15 and 16 of the wheel are of a suitable metal whereby the entire assembly, except the tire 17, is composed of appropriate kinds of metal. The joined walls 25 and 26 adjacent their outer periphery are also provided with four equidistant openings for accommodating the nut and bolt assemblies 18 whereby the clutch housing with parts carried thereby may be mounted to a wheel.

Positioned within the housing and carried by the wall 25 is a ratchet wheel 27. An annular spacer 28 is disposed between the ratchet wheel 27, and the wall 25 as illustrated. The ratchet wheel 27 and spacer 28 are held to the wall 25 by four screw bolts 34 extending therethrough whereby the ratchet wheel 27 is held firmly to the housing and is also mounted concentrically of the sleeve 20 and thereby concentrically of the shaft 11. This ratchet wheel in the example form illustrated has a plurality of internal teeth, seven teeth being shown by way of example. Each tooth of ratchet wheel 27 has a side 27A and an opposite side 27B. Upon pressing one of the sides 27A with sufficient force, the ratchet wheel 27 is rotated in one direction. Upon pressing the side 27B, the tooth with a sufficient force, the ratchet wheel 27 is rotated in an opposite direction as in the usual manner.

A pawl carrier 29 is non-rotatively mounted on the first sleeve 20 so as to revolve therewith around the shaft axis. The internal bore of the carrier 29 has oppositely disposed flats which non-rotatively mate with flats 20B formed on the sleeve 20, whereby the carrier 29 is positively locked with the first sleeve 20 so as to revolve therewith and thereby to revolve as the shaft 11 rotates on its axis. A snap retainer ring 35 retains the carrier on the first sleeve 20. The carrier 29 has a projection 29A extending radially therefrom, which projection 29A has a round or cylindrical surface. The axis of the round or cylindrical surface of projection 29A is parallel to the axis of the carrier 29 and hence of the axis of shaft 11. As the shaft 11 rotates, the projection 29A revolves around the shaft axis.

A double-ended pawl 30 is mounted upon the projection 29A so as to be carried thereby as projection 29A revolves. The pawl 30 is symmetrical in that its opposite ends are similar in shape and mass but the ends as seen in the drawings are directed away from each other. Formed in this pawl 30 is a radially inward directed socket 30A having a round or cylindrical wall which complements the round or cylindrical shape of projection 29A. There is a sliding fit between the projection 29A and the inner wall of the socket 30A whereby the pawl 30 may freely rock back and forth about the axis of the cylindrical shape projection 29A.

Disposed on one side of the pawl 30 and closing one axial end of the socket 30A is a plate 31. Disposed on the opposite side of the pawl 30 is a plate 32 which closes the opposite axial end of the socket 30A. By means of the plates 31 and 32, the pawl 30 is retained upon the projection 29A against movement parallel to the axis of the cylindrical projection 29A. The plate 30 and the major portion of the plate 32 complement the shape of the pawl 30 and in effect, the pawl 30, plate 31 and plate 32 are integral. Two rivets 33 extending through the adjacent plate 31, the pawl 30 and plate 32 secure them together.

Plate 32 has an upwardly extending finger or projection 32A which finger 32A is bent over at its outer end to form the bent-over portion 32B, the plate 32 being of a suitable material to accommodate for this forming of the finger or projection 32A As seen in the drawings, the bent-over portion 32B of finger 32A is disposed generally parallel to the axis of the shaft 11. Movement of the finger portion 32B in one direction rocks the pawl one way and movement of the finger portion 32B in the opposite direction correspondingly rocks the pawl another way.

Mounted upon the second sleeve 21 adjacent its inner axial end is an actuator 38. The actuator 38 has an inner round opening which accommodates the sleeve 21 therein. The inner fit of the actuator 38 on the sleeve 21 is such that the actuator 38 may revolve around the sleeve 21 and hence around the shaft 11. The actuator 38 is embraced between two snap retainer rings 36 and 37 disposed in annular grooves in the sleeve 21 and firmly embracing the sleeve 21. Positioned between the actuator 38 and the snap retainer ring 37 is a bent spring washer 39 which is so distorted and so resilient as to urge the actuator 38 axially away from the retainer ring 37 and against the retainer ring 36. The retainer ring 37 slidably engages the flange 24A of annular member 24 whereby the annular member 24 may freely revolve relative to the retainer ring 37. As seen in the drawings, the inner axial ends of sleeves 20 and 21 are spaced apart so as to permit rotation of sleeve 20 relative to sleeve 21.

The interfit of retainer ring 36, actuator 38, spring washer 39, and retainer ring 37 is such that there is a frictional resistance to the turning of the actuator 38 around the sleeve 21, this frictional resistance being maintained by the bias of the spring washer 29. At the same time, this frictional resistance is yieldable so that the actuator 38 may revolve around the sleeve 21 upon the application of sufficient force upon the outer free end of the actuator 38 to overcome the frictional resistance. The revolving direction of the actuator 38 of course is in accordance with the direction and degree of the force applied to the outer free end of the actuator 38.

As seen better in FIGURE 6, the outer free end of the actuator 38 is provided with a radially extending notch 38A, which notch 38A has two spaced parallel side walls 38B and 38C. The spacing between the side walls 38B and 38C is sufficiently great that the bent-over finger portion 32B extending through the notch 38 is necessarily spaced at all times from one or the other of the side walls 38B and 38C. In other words, the space between 38B and 38C is substantially greater than the width of the bent-over finger portion 32B extending therethrough. In this manner there may be a certain amount of relative movement between the finger portion 32B and one of the sides of notch 38A before there is interengagement of finger portion 32B and the actuator 38.

By reason of the described structure, proportioning of dimensions and relationship of the parts, rotation of the shaft 11 in one direction causes the carrier 29 and pawl 30 carried thereby to revolve in a corresponding rotative direction about the shaft axis. The finger portion 32B carried by the pawl first moves against one of the sides 38B and 38C of the actuator and then with sufficient force as to cause the actuator 38 to revolve concurrently with the carrier 29 about the shaft axis. The force is sufficient to overcome the described yieldable frictional resistance and thus the actuator 38 and carrier 29 revolve together about the shaft axis. However, the interaction between the finger portion 32B and the actuator 38 engaged thereby is such that the pawl 30 to which the finger portion 32B is attached is cocked in a corresponding manner so as to cause one of the ends of the pawl to engage one of the ratchet teeth sides 27A or 27B. Upon the shaft rotating in the opposite direction and thus revolving the carrier 29 and pawl 30 carried thereby, the finger portion 32B moves across to engage the other side of the notch 38A and thereafter to apply such a force on the actuator 38 as to cause it to revolve, against the described yieldable frictional resistance, with the carrier 29 about the the shaft axis.

Therefore, by reason of the loose interfit of the finger 32B in the notch 38A, there is a lost motion mechanism provided whereby one part revolves a limited distance before the other part is engaged and revolved therewith. The frictional resistance provides that there is always a lagging of the actuator 38 relative to the revolving movement of the carrier 29. In other words, the carrier 29 and pawl carried thereby has an initial revolving movement before the actuator 38 is caused to revolve. This lagging and free-play provided causes the pawl to cock in a corresponding manner, the pawl being free to be rocked by the finger portion 32B on the said axis of the cylindrical projection 29A within the cylindrical socket 30A.

Figure 2:
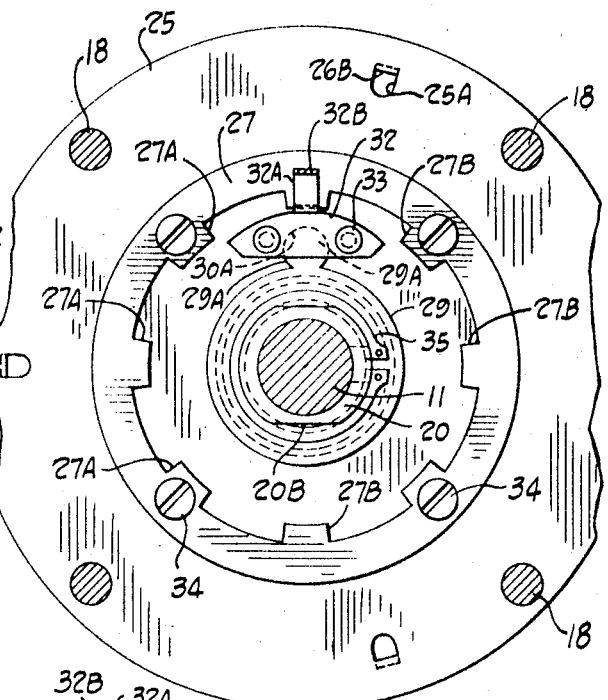
FIGURE 2 is a cross-sectional view taken through the partially offset line 2—2 of FIGURE 1, looking in the direction of arrows 2—2, and being normal to the axis of the mechanism, the pawl being shown in neutral or uncocked position.
Figure 3:
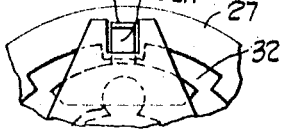
FIGURE 3 is a partial view of the mechanism shown in FIGURE 1 taken through the line 3—3 of FIGURE 1.
Figure 4:
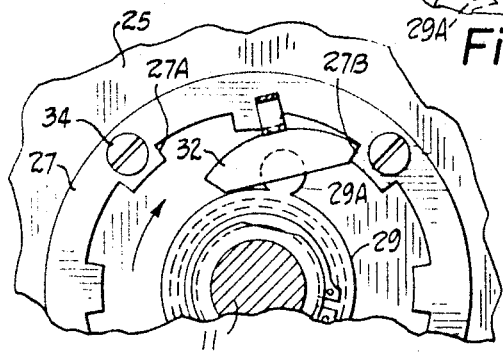
FIGURE 4 is a view somewhat like that of FIGURE 2 showing the pawl cocked in a way for driving the ratchet wheel in one rotative direction.
Figure 5:
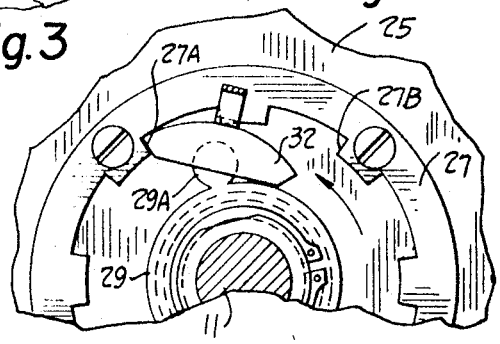
FIGURE 5 is another view somewhat like that of FIGURE 2 and showing the pawl cocked in an opposite way for driving the ratchet wheel in an opposite rotative direction.

In FIGURES 1, 2 and 3, the pawl is in its neutral or unlocked position. In FIGURE 4, the pawl is cocked so as to engage a side 27B of the ratchet wheel 27 and thus to drive the ratchet wheel in one direction in accordance with the rotative movement of the shaft 11. In FIGURE 5, the pawl is cocked to engage a tooth side 27A of the ratchet wheel 27 and thus to drive the ratchet wheel 27 in the opposite rotative direction and in accordance with the rotative movement of the shaft 11. As the ratchet wheel is secured to the wall 25 of the respective housing, which in turn is secured to a wheel 14, the respective wheel is accordingly revolved. The pawls and ratchets are arranged on the mechanism at the opposite ends of a shaft, such as a tractor axle, so that as the shaft is rotated, the wheels mounted at the opposite ends of the shaft, such as a tractor axle, are correspondingly rotated.

The rounded outer side of the pawl, which in the positions shown in the drawings happens to be the upper side of the pawl, provides that the pawl may slip past the teeth when the ratchet wheel carried by a tractor wheel revolves faster than the shaft. This permits the tractor wheel on one end of the axle to revolve faster than the rotation of the axle, such as in the turning of the tractor. By reason of this slip or free-wheeling permitted at one end of the axle or shaft while maintaining driving engagement at the other end of the axle or shaft in turning a tractor obviates the need of a conventional differential in such vehicles, such as mowers, tractors or the like.

The action is fast in that the pawl is quickly set and cocked so as to drive the wheel almost immediately as the shaft is rotated and in accordance with the direction of rotation. The initial movement required for cocking the pawl is small as the shaft first rotates in one direction to drive the wheel. Upon the shaft being rotated in opposite direction, the clutch mechanism very quickly thereafter is actuated so as to drive the wheel in a corresponding opposite direction. There is very little lost motion between the rotation of the shaft and the revolving of the wheel and such motion is only of suficient degree as to require the cocking of the pawl by the described lagging of the actuator relative to the revolving of the pawl carrier.

It is to be noted that an assembly is thus provided which is self-contained within a housing and which may be fabricated at a factory, ready for shipment to a manufacturer of mowers, tractors, and other vehicles. Such latter manufacturer need only mount the assembly on the end of a shaft by inserting a pin 19 through aligned openings in the sleeve 20A and end of shaft 11. The wheel 14 is quickly and easily mounted to the housing of the assembly by means of the nut and bolt asemblies 18. Thus there is no chance on the part of the final manufacturer such as a tractor manufacturer to get the internal parts arranged in a wrong order as they are all preassembled, mounted in position, and held together by the housing made up of joined walls 25 and 26.

A modification is illustrated in FIGURES 7 and 8. Rather than having a finger positioned within a notch of an actuator, there is a magnetic attraction between the finger attached to the pawl and the actuator. In this latter modification, the actuator is in the form of a circular disc 138 and has an off-center mass or weight 138A disposed on one side of the axis thereof. This mass 138A is such as to urge by force of gravity the actuator 138 against revolving about the sleeve 21. However this may be overcome so as to permit the actuator 138 to revolve against the gravity pull on the mass 138A. There is relatively little frictional resistance provided to the revolving of actuator 138 in this modification due to the looser interfit or spacing between actuator 138, spacer washer 39A and retaining rings 36 and 37 to minimize the frictional engagement with rings 36 and 37 as in the case of the first described form of the invention.

Mounted upon the finger 132A of the plate 132 secured to a side of the pawl 30 is a permanent magnet held in a small cylindrical socket secured to the magnet carrying finger 132A. The permanent magnet may be closely fit in the socket and held by turned-in edges of the socket against its falling out. The end of the magnet 140 protrudes outwardly from the socket toward and against the side of actuator 138 near its circumferential periphery. The actuator 138 is of ferrous material so that there is a magnetic attraction between the magnet 140 and the actuator 138. The actuator 138 is sufficiently flexible and has sufficient play in it that the outer periphery of the actuator 138 is pressed against the magnet 140 by the magnetic attraction and hence against the finger 132A. There is however, a sliding interengagement between the ends of the magnet 140 and the side of the actuator 138 so that the magnetic attraction may yield and there may be relative revolving movement between the actuator 138 and the finger 132A for cocking the pawl 30. By means of the described structure the actuator 138 tends to lag the revolving of the carrier 29, the pawl 30 carried thereby, and the finger portion 32A and magnet 140. This lagging reaction causes the pawl 30 to be cocked to one of its alternative cocked positions in correspondence with the rotation of the shaft 11. In operation there may be some continuous sliding action between the magnet 140 and actuator 138 and also between the actuator 138 and the spring washer 39 and retaining ring 36 near its inner peripheral edge. The mass 138A tends to provide such inertia as to diminish free-swinging motion of the actuator 138 such as through vibrations or tractor movements as might cause cocking of the pawl other than by a positive and driving rotation of the shaft 11 in one of its alternative directions.

The other parts of the modification shown in FIGURES 7 and 8 and which facilitates its ready fabrication in an assembled unit are similar to that described and shown in the preferred embodiment shown in the other figures.

The present disclosure includes that contained in the appended claims, as well as that of the foregoing description.

What is claimed is:

1. In a pawl-type clutch mechanism for providing a clutching interengagement between a ratchet wheel and a rotatable shaft journalled on a device having a fixed part, the combination of a first sleeve mountable on said shaft at a first location therealong to be rotated therewith, a second sleeve mountable about said shaft at a second location axially spaced from said first location and axially aligned with said first sleeve, said second sleeve being securable to said fixed part to permit the shaft to rotate relative to said second sleeve, a pawl-carrying carrier mounted on said first sleeve to revolve therewith about the axis of the shaft upon rotation of said shaft, a pawl carried by said carrier, an actuator carried by said second sleeve, said actuator being disposed to actuate the said pawl into clutching interengagement with said ratchet wheel upon relative revolving movement of the carrier relative to said actuator about the shaft axis, frictional resisting means carried by said second sleeve and engaging said actuator for yieldably resisting revolving of the actuator about said shaft axis, interconnecting lost-motion means operatively connecting the carrier and actuator to permit an initial limited movement of the carrier relative to the actuator for providing said relative revolving movement between the carrier relative to the actuator and actuation of the pawl, and means holding said first and second sleeves in alignment to be mounted with said parts carried thereby as a unit on said shaft.

2. The combination claimed in claim 1, and including a first annular member journalled on the first sleeve to be revolvable about the first sleeve and shaft, a second annular member journalled on the second sleeve to be revolvable about the second sleeve and shaft, and a housing enclosing said ratchet wheel, pawl-carrying carrier, actuator and frictional resisting means, said housing being secured to said first and second annular members to revolve therewith.

3. The combination claimed in claim 2, in which said first sleeve adjacent an outer end thereof has an external flange abuttable by an outer end of said first annular member to restrain axial movement of the first annular member in one axial direction, in which said second sleeve adjacent an outer end thereof has an external flange abuttable by an outer end of said second annular member to restrain axial movement of the second annular member in an opposite axial direction, in which each of said annular members has a radially extending flange adjacent the inner ends thereof, said flanges accommodating said carrier, actuator and frictional resisting means therebetween.

4. The combination claimed in claim 3, and including a housing for said carrier, actuator and frictional resisting means, said housing having spaced radially extending walls embracing said flanges of the first and second annular members and secured to said annular members to revolve therewith about the shaft axis.

5. A pawl-type clutch assembly to be mounted on a rotatable shaft for providing clutching engagement with a ratchet wheel, comprising the combination of a first and second sleeve adapted to be mounted concentrically on said shaft in axial alignment with each other, the first sleeve being adapted to be secured to the shaft to rotate therewith and the second sleeve being adapted to be secured to a relatively non-rotative part to resist rotation with the shaft, the first sleeve having a flange adjacent one axial end of the assembly, the second sleeve having a flange adjacent an opposite axial end of the assembly, a first annular member journalled on the first sleeve to be revolvable thereabout, a second annular member journalled on the second sleeve to be revolvable thereabout, said annular members being in axial alignment and being embraced at opposite axial ends of the assembly by the flanges of the sleeves, respectively, a ratchet wheel carried by the first annular member to revolve therewith, a carrier carried by the first sleeve to revolve therewith as the shaft rotates, a pawl carried by the carrier to revolve therewith about the shaft axis as the shaft rotates, said pawl being positioned to be actuated into engagement and disengagement with said ratchet wheel, an actuator carried by said second sleeve in position to actuate the pawl upon relative revolving movement between the carrier and actuator, and a housing for said ratchet wheel, carrier, pawl and actuator, the said housing being secured to said first and second annular members and restraining the same against axial displacement away from each other.

6. An assembly as claimed in claim 5 and in which said annular members each have a radially extending flange disposed axially inward of the assembly, the said flanges being spaced axially apart and accommodating therebetween the carrier carried by the first sleeve and the actuator carried by the second sleeve, the said housing having spaced radially extending wall portions embracing said spaced flanges of the said annular members.

7. An assembly as claimed in claim 6 and in which said ratchet wheel is carried by one of said spaced radially extending walls of the housing, and in which said housing has a hub portion embracing said annular members, the hub portion comprising a first annular flange on the inner radial periphery of one radially extending wall and a second annular flange on the inner radial periphery of the other radially extending wall, said annular flanges being extended in axial directions away from each other about the outer walls of the respective annular members.

8. A clutch assembly adapted to be mounted on a rotatable shaft journalled on a device having a fixed part and to a wheel to be driven by the shaft, said wheel having a web to which the assembly may be secured and a central opening into which the shaft may extend, said clutch assembly comprising a first sleeve mountable on the shaft to revolve therewith, a second sleeve mounted on the shaft and securable to said fixed part to resist revolving as said shaft rotates, said sleeves being in axial alignment and the first sleeve being at one end of the assembly and the second sleeve being at the opposite end of the assembly, a first annular member journalled on said first sleeve to be revolvable therearound, a second annular member journalled on said second sleeve to be revolvable therearound, a housing having spaced walls, a first of said walls being secured to said first annular member and a second of said walls being secured to said second annular member whereby said housing and annular members revolve together around the shaft axis, a ratchet wheel mounted within the housing to said first wall concentrically of said shaft axis, a pawl positioned within said housing and carried by said first sleeve to revolve therewith about the shaft axis and in position to be engageable with said ratchet wheel for driving the same in accord with the rotation of the shaft and first sleeve, and actuating means having at least a portion carried by said second sleeve and positioned to actuate said pawl upon initial relative revolving movements of said first sleeve and the pawl carried thereby relative to said second sleeve and the portion of the actuating means carried thereby.

9. A clutch assembly as claimed in claim 8 and in which said side walls of the housing are joined adjacent their outer periphery and adapted to be secured to the web of a wheel, and said side walls of the housing have annular flanges at their inner peripheries and extending axially away from each other, the said annular flanges being non-rotatively secured to said first and second annular members, respectively.

10. A clutch assembly as claimed in claim 9, and in which said first and second sleeve members have flanges positioned at the opposite axial ends of the assembly and disposed to abut the first and second annular members, respectively, to retain the annular members from axial movement away from each other, and in which said annular members have flanges positioned at their inward axial ends and disposed axially inwardly of, and abutting, the said side walls, respectively, of the housing, said first and second sleeves, respectively, carrying means adjacent their inward axial ends abutting the inner axial ends, respectively of said annular members to retain the annular members against axial movement toward each other.

References Cited

UNITED STATES PATENTS

| | | | |
|---|---|---|---|
| 642,927 | 2/1900 | Schneider | 192—46 XR |
| 2,784,820 | 3/1957 | Clark | 192—43.1 XR |
| 3,055,471 | 9/1962 | Warn et al. | |
| 3,249,185 | 5/1966 | Moorhead | 192—43.1 |

CARLTON R. CROYLE, Primary Examiner

ALLAN D. HERRMANN, Assistant Examiner

U.S. Cl. X.R.

192—35, 46, 50